Oct. 18, 1966    J. W. MONTOOTH    3,280,310
AIRCRAFT LANDING SYSTEM
Filed Oct. 13, 1961    7 Sheets-Sheet 1

INVENTOR.
JACK W. MONTOOTH
BY Allan Rothenberg
ATTORNEY

INVENTOR.
JACK W. MONTOOTH

INVENTOR.
JACK W. MONTOOTH

Oct. 18, 1966  J. W. MONTOOTH  3,280,310
AIRCRAFT LANDING SYSTEM
Filed Oct. 13, 1961  7 Sheets-Sheet 6

INVENTOR.
JACK W. MONTOOTH
BY *[signature]*
ATTORNEY

INVENTOR.
JACK W. MONTOOTH
BY
Allen Rothenberg
ATTORNEY

United States Patent Office

3,280,310
Patented Oct. 18, 1966

3,280,310
AIRCRAFT LANDING SYSTEM
Jack W. Montooth, Long Beach, Calif., assignor to
North American Aviation, Inc.
Filed Oct. 13, 1961, Ser. No. 144,935
16 Claims. (Cl. 235—150.22)

This invention relates to an automatic landing system and more particularly to an improved terminal prediction computer for achieving automatic flare-out and touchdown of an aircraft.

The functional requirements of a completely automatic landing system are the ability to (1) control an aircraft to a specified glide slope consistent with both passenger comfort on one hand and traffic control considerations on the other, (2) maintain the aircraft upon such glide slope until the aircraft is approximately over the assigned runway, (3) cause the aircraft to then execute a flare-out maneuver as to reduce descent rate to a safe limit upon touchdown of the aircraft upon the runway, and (4) limit the time or runway range in which all these things are performed to a reasonably predictable time interval or range distance.

Many types of aircraft landing systems have been devised from time to time for performing some or all of the above enumerated functional requirements. Some systems, for example, have provided only a constant descent rate as a function of time, leaving the pilot to initiate and perform a proper flare maneuver for assuring safe contact of the aircraft with the runway. A further disadvantage of such constant rate of descent system is that the associated rate of descent performance is independent of the runway range performance of the aircraft. Other types of systems devised to overcome the range performance limitation have relied on fixed-path geometry control schemes to effect a landing within a specified range and descent rate. The disadvantage of these fixed-geometry systems is that the response of the vehicle, including the closed loop control system may result in large "g" maneuvers with resultant passenger discomfort, or flight path transients including undershoots which might possibly result in uncontrolled impact of the aircraft into the runway.

One means for overcoming the disadvantages of the above described landing systems has been the development of a terminal prediction aircraft landing system as described in the U.S. patent application of Elliott R. Buxton, Serial No. 35,306 filed June 10, 1960 for Terminal Prediction Aircraft Landing System, now U.S. Patent 3,059,880. Such device relies upon the somewhat constant forward landing speed of an aircraft to establish a relationship between runway range and the time interval specified for touchdown. Further, the device employs clock means to control the aircraft to accomplish a touchdown upon the runway (1) within such time interval (2) within the maximum allowable sink-rate or rate-of-descent at touchdown and (3) without interim trajectory undershoot transients. However, the device of the above described application employs means for explicit computation of predicted performance parameters used in the control system. The resulting computer mechanization requires the summation of several individual sets of terms derived by independently operating upon sensed parameters with several variable gain parameters. The result of the summations is generally a small valued term produced by differences between large valued terms, thereby making the accuracy of the resultant small valued term extremely sensitive to the tolerances associated with such large valued terms. The computer which mechanizes the explicit computation is physically complicated, bulky, and sensitive to adjustments of the many individual mechanized terms of the terminal prediction equation. The complexity of the device makes it less reliable than is to be desired, and the large number of adjustments required makes the device difficult to maintain.

Accordingly, it is a general object of this invention to provide an improved terminal prediction computer for an automatic landing system which is relatively simple and reliable.

In carrying out the principles of this invention in accordance with a preferred embodiment thereof, there is provided a time-drive mechanism for supplying signals indicative of the time interval remaining until a predetermined instant. There is also provided a first function generator driven by the time drive mechanism. The first function generator is responsively connected to a source of signals indicative of the difference between the desired touchdown sink rate of an aircraft and the present sink rate of such aircraft for generating a desired current descent rate reference signal component. Other signal components indicative of present altitude relative to the reference altitude of a landing strip and indicative of the time interval remaining are summed with the output of the first function generator by a summing device. Integrating means responsively connected to the output of the summing device provides a present reference signal for an aircraft controller, whereby an aircraft may achieve touchdown upon the landing strip within the time interval remaining and at a specified descent rate.

There is further provided output means for comparing the present descent rate of the aircraft with the present reference signal to generate a signal indicative of present descent rate error. A second function generator driven by the time drive mechanism may be responsively connected to the output means to provide a further correction signal component to the input of the summing device. Such further correction signal component compensates for any deviation of the present aircraft descent rate from a desired present descent rate.

For a particular application, a time-to-go or initial time interval is preselected. In operation, the time drive mechanism is turned on when the aircraft is at a particular combination of range and altitude or other preselected arbitrary point relative to an intended runway or landing strip.

By means of the above described arrangement, the aircraft is controlled so as to perform a flare-out or landing maneuver and touchdown within the prescribed time interval, with a prescribed descent rate at the time of touchdown. Further, the above described arrangement provides a minimal mechanization having improved reliability, reduced bulk, and increased ease of maintenance.

Therefore, it is an object of this invention to provide an improved terminal prediction computer for an automatic landing system having no more than two arbitrary function generators.

It is another object of this invention to provide a terminal prediction computer occupying minimum weight and space.

It is a further object of this invention to provide a terminal prediction computer that is economical to manufacture, relatively reliable to operate and simple to adjust.

It is yet another object of this invention to provide a two-condition terminal prediction computer employing mechanization of a minimum number of parameters.

These and other objects of the invention will become apparent from the following description taken in connection with the accompanying drawings in which:

FIG. 1 is a time history depicting a representative response of an exemplary physical system to a unit impulse forcing function.

FIGS. 2(a) to 2(f) are a time history of a representation response of an exemplary physical system to a continuous forcing function, showing the forcing function treated as a sequence of impulses of various magnitudes.

In the drawings like reference characters refer to like parts.

The principle of operation of a terminal prediction controller is based upon a theory of differential equations that the future state of a physical system is completely defined by the solution of the differential equations describing the motion of the system. According to such theory, such solution is always obtainable provided all of the initial conditions defining the system are known and further provided that the nature of any external forcing function is known. Utilizing this theory, equations may be obtained which predict deviations (e.g. errors) from some specified (e.g., desired) state at some specified future time. The proper mechanization of such equations may be used as the basis for a terminal prediction control system.

One convenient means of examining a system describing function and an applied forcing function while simplifying the consideration of initial conditions is to consider the external forcing function as being comprised of a sequence of impulses, and treating the response of the physical as being a sum of the separate responses of the system to each of the applied impulses.

Figure 1:
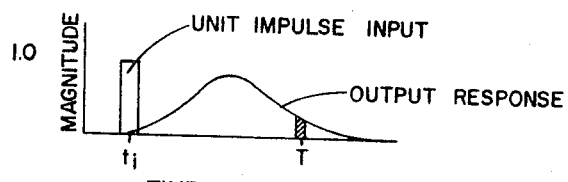
Figure 2A:
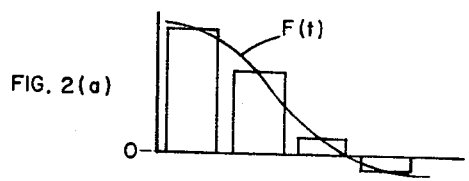
Figure 2B:
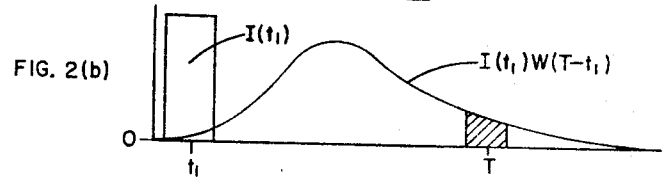
Figure 2C:
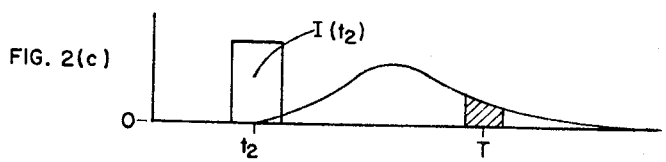
Figure 2D:
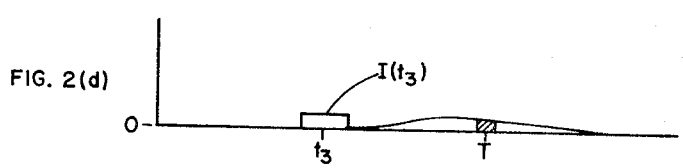
Figure 2E:
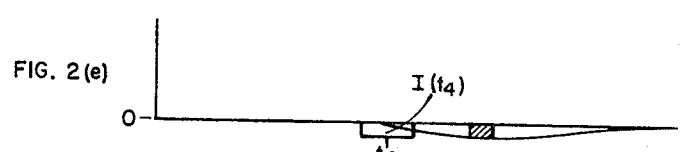
Figure 2F:
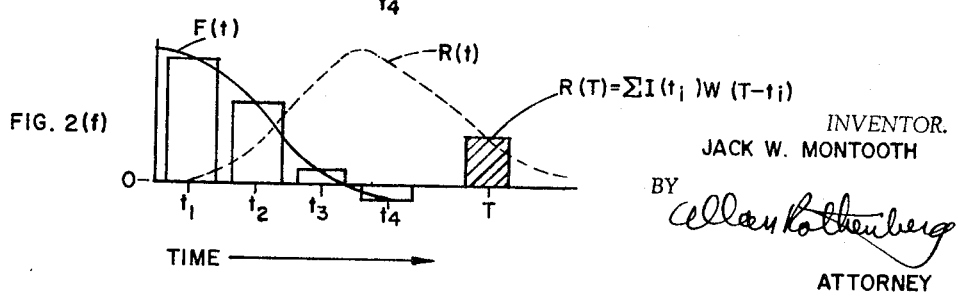

Referring to FIG. 1 for example, there is described a unit impulse applied at $t_i$ to a physical system, and the associated response of the system to such impulse. Such response is exemplary only, and could be of any shape, size or form, depending upon the particular physical system to be so described by such describing function. The predicted response at a specified future time or terminal time T is shown by the ordinate at a time interval $(T-t_i)$ later.

Referring to FIG. 2, a particular forcing function is shown at 2(a) alternatively as the sum of a sequence of impulses, $I(t_1)$, $I(t_2)$, $I(t_3)$–$I(t_i)$. The response to each impulse is the normalized describing function $W(T-t)$ for a unit impulse multiplied by the magnitude scale and sign of the particular impulse of interest, the contribution to the terminal response R(T) at time T for each of impulses $I(t_1)$, $I(t_2)$, $I(t_3)$–$I(t_i)$ being $I(t_1)W(T-t_1)$, $I(t_2)W(T-t_2)$, $I(t_3)W(T-t_3)$–$I(t_i)W(T-t_i)$ respectively. The terminal performance R(T) at time T (FIG. 2(f)), predicted at any time $t_i$ is the summation of the terminal response contribution made by each impulse occurring up to time $t_i$:

$$R(T) = \sum_{t_o}^{T} I(t_i)W(T-t_i) \quad (1)$$

Where $t_i < T$

The relationship of Eq. (1) may be mechanized by providing an arbitrary function potentiometer wound so as to represent the weighting function $W(T-t_i)$, and employing a time drive (constant speed) device to drive such potentiometer. Such weighting function may be determined empirically by measurement of the time response of the physical system to a unit impulse, or by analog computer simulation techniques or by other methods well known to those skilled in the art. The potentiometer would be excited by an electrical analog of the system forcing function as provided by a suitable transducer or like means well known in the art. The means for performing the summation over the time interval $(T-t_o)$ would be an electronic integrator, such as the Miller integrator or other such means as is well known to those skilled in the art.

Figure 3:
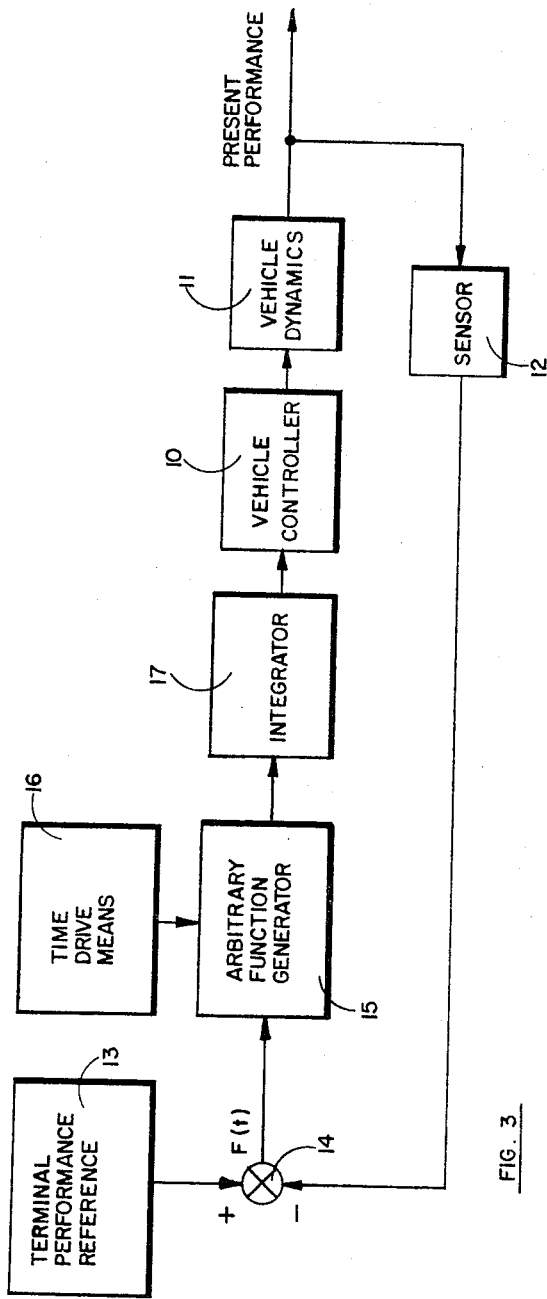
FIG. 3 is a functional block diagram of a single conditional terminal predictor, illustrating the mechanization of the principles of FIG. 2 in a control system application.

For example, referring to FIG. 3 there is shown a functional block diagram of a single condition terminal prediction system including a vehicle controller 10 for controlling a vehicle 11 having dynamic properties. A single parameter of the response of the vehicle is sensed by sensor 12, corresponding to the parameter for which single condition terminal prediction control is desired. The output of sensor 12 is compared with the specified terminal performance reference 13 by means of comparator 14. The output from comparator 14 provides a forcing function F(t) which is multiplied or scaled by the attenuation of arbitrary function generator 15. Such function generator may be a non-linear potentiometer so wound as to present a variable impedance that varies with shaft position in a manner representing the weighting function or terminal performance deviation prediction for a unit impulse forcing function. Time-drive means 16 is provided for driving function generator 15 at a constant speed indicative of real time. An integrator 17 is responsively connected to the output of function generator 15 to generate a control signal which is indicative of the predicted deviation of the vehicle terminal performance (e.g., future performance at time, T). Such control signal is of such a sense and magnitude as to cause the vehicle controller 10 to induce present compensatory response of the vehicle 11 so as to reduce the predicted deviation in terminal performance (e.g., the control signal is made to approach zero).

Of course, in a system displaying complex dynamic inter-relationships, such as in an aircraft, a particular parameter may be subject to deviation or change in response to a change in more than one parameter. Further, more than one parameter may be desired to be subjected to terminal prediction control. Hence, the single sensor input illustrated in FIG. 3 may be inadequate for explicit terminal prediction problems involving more than one parameter as applied to a vehicle having a complex dynamic response.

A two-condition terminal controller for an aircraft landing system application is described in the aforesaid U.S. patent application. Such system mechanizes the differential equations explicitly describing several control parameter relationships in the terminal prediction control of descent and rate-of-descent of an aircraft. Such an embodiment as illustrated therein may be described as an explicit computation means.

The illustrated embodiment of U.S. patent application, Serial No. 35,306 may be described analytically by the following equations:

$$\ddot{h}_c = \ddot{h}_c(\dot{h}_p) + K_1 \ddot{h}_c(h_p) \quad (2)$$

$$\ddot{h}_c(\dot{h}_p) = (\dot{h} - \dot{h}_T + \dot{h}_e G_1) G_2 \quad (3)$$

$$\ddot{h}_c(h_p) = h + \ddot{h}_c(\dot{h}_p) G_3 + \dot{h} G_4 + \dot{h}_e G_5 \quad (4)$$

where:

$\ddot{h}_c$ = altitude acceleration command required to adjust the final value of both altitude and altitude rate.

$\ddot{h}_c(\dot{h}_p)$ = altitude acceleration command, computed by the terminal time altitude rate predictor, required to adjust the final value of altitude rate.

$\ddot{h}_c(h_p)$ = altitude acceleration command, computed by the terminal time altitude predictor, required to adjust the final value of altitude in the presence of the altitude acceleration command from the terminal time altitude rate predictor.

$K_1$ = a gain constant
$h$ = altitude
$\dot{h}$ = altitude rate
$\dot{h}_T$ = desired final altitude rate
$\dot{h}_e$ = altitude rate error
$T$ = flare interval
$t$ = real time
$(T-t)$ = time to go
$G_1$ = System altitude rate weighting function or altitude rate response to an altitude rate error step with the argument shifted from $(t)$ to $(T-t)$.
$G_2$ = The reciprocal of the system altitude rate weighting function or altitude rate response to an altitude acceleration command step with the argument shifted from $(t)$ to $(T-t)$.
$G_3$ = The altitude weighting function or altitude response to an altitude acceleration command step with the argument shifted from $(t)$ to $(T-t)$.
$G_4$ = The system altitude weighting function or response to an altitude rate step with the argument shifted from $(t)$ to $(T-t)$.
$G_5$ = The system altitude weighting function or response to an altitude rate error step with the argument shifted from $(t)$ to $(T-t)$.

It is to be observed that for the two-condition terminal control system described by Equations 2, 3 and 4 that in addition to two sensors (one each for altitude $h$ and altitude rate $\dot{h}$), that the mechanization requires five arbitrary function generators (one each for $G_1$, $G_2$, $G_3$, $G_4$ and $G_5$). Further, these function generators, while being driven by a common time drive source, must be carefully mechanically adjusted relative to each other to preserve the accuracy of the explicitly computed terminal prediction result. Further, the gains employed in electrically summing the electrical signals of the explicit mechanization require careful matching of the circuit elements comprising the electrical summing network. In other words, a requirement for explicit solutions for control of two parameters suffers from the shortcoming of cumbersome hardware that is complex to maintain.

Equations 2, 3 and 4 can be mathematically manipulated to develop a single equation defining the altitude acceleration command required to adjust both the final value of altitude and altitude rate to the desired value. Equation 5 represents the result of direct substitution of Equations 3 and 4 into Equation 2:

$$\ddot{h}_c = G_2(T-t)(\dot{h} - \dot{h}_T + \dot{h}_e G_1) + K_1 h$$
$$+ G_3 G_2(\dot{h} - \dot{h}_T + \dot{h} G_1) + \dot{h} G_4 + \dot{h}_e G_5 \quad (5)$$

By collecting the terms in Equation 5 in such a manner as to isolate the coefficients of each of the three basic system variables, Equation 6 results:

$$\ddot{h}_c = \dot{h}_e(G_2 G_1 + K_1 G_1 G_2 G_3 + K_1 G_5)$$
$$+ \dot{h}(G_2 + K_1 G_2 G_3 + K_1 G_4)$$
$$+ h(K_1) - \dot{h}_T(G_2 + K_1 G_2 G_3) \quad (6)$$

Further manipulation of Equation 5 and the inclusion of Equation 6 will result in Equations 7 and 8:

$$G_4 = (T-t) \quad (7)$$

$$\ddot{h}_c = \dot{h}_e[G_1 G_2(1 + K_1 G_3) + K_1 G_5]$$
$$+ (\dot{h} - \dot{h}_T)[G_2(1 + K_1 G_3) + K_1(T-t)]$$
$$+ h(K_1) + \dot{h}_T[K_1(T-t)] \quad (8)$$

Equation 8 can be written as follows:

$$\ddot{h}_c = H_1 \dot{h}_e + H_2(\dot{h} - \dot{h}_T) + h K_1 + K_2(T-t) \quad (9)$$

where:

$H_1 = G_1 G_2(1 + K_1 G_3) + K_1 G_5$
$H_2 = G_2(1 + K_1 G_3) + K_1(T-t)$
$K_2 = K_1 \dot{h}_T$, a constant Equation 9 is the desired equation, the mechanization of which requiring only two function generators ($H_1$ and $H_2$) and summing only five terms, as compared to the five function generators and summation of nine terms of the previously described system. Because Equation 9 eliminates the explicit occurrence of most of the individual terms of the previous solution, Equation 9 may be considered as an implicit solution.

Figure 4:
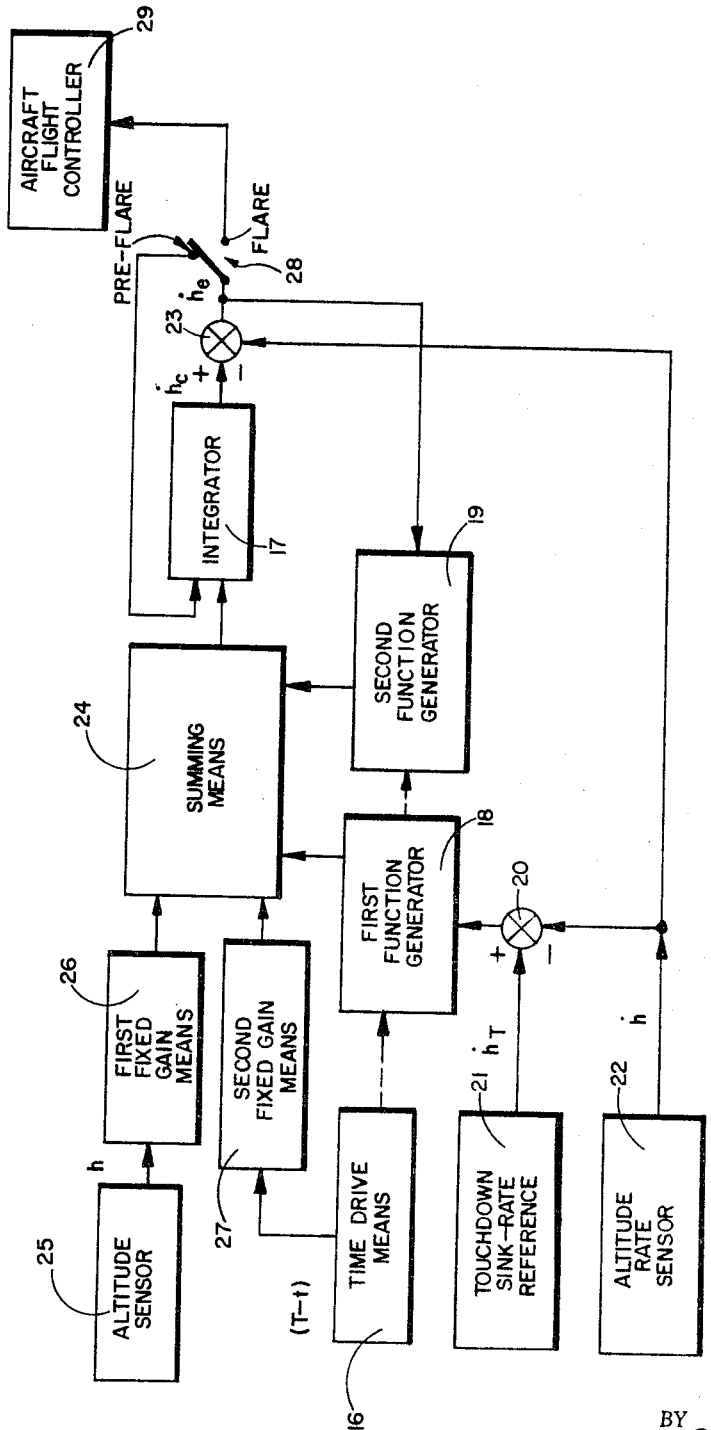
FIG. 4 is a functional block diagram of a preferred embodiment of the invention.

Referring to FIG. 4, there is illustrated a functional block diagram of a preferred embodiment of the device of this invention, showing the mechanization of Equation 9. Because of the reduction of terms employed in the implicit form of solution of Equation 9, the terminal prediction computer of FIG. 4 is inherently simpler, less bulky, and easier to adjust without sacrificing any of the basic performance advantages of the terminal prediction technique. There is provided a time drive mechanism 16 for providing signals indicative of the time interval $(T-t_i)$ remaining until a predetermined instant. A mechanical output from time drive means 16 is commonly employed to drive both of first and second function generators 18 and 19.

First function generator 18, corresponding to term $H_2$ of Equation 9, is responsively connected to a signal source indicative of the difference between the specified rate of descent at touchdown and the present rate of descent. Such signal source is comprised of first comparison means 20 responsively connected to a touchdown sink rate reference 21 and the output of an altitude rate sensor 22 for providing a signal indicative of the difference in magnitude therebetween.

Second function generator 19, corresponding to term $H_1$ of Equation 9, is connected to a second signal source indicative of the difference between a present descent rate reference and the present rate of descent. Such signal source is comprised of second comparison means 23 responsively connected to the output of the terminal prediction controller (as measured at the output of integrator 17) and the output of altitude rate sensor 22 for providing a signal indicative of the difference in magnitude therebetween.

A summing device 24 is responsively connected to the output of each of function generators 18 and 19, time drive means 16 and a third signal source 25 indicative of the present altitude relative to the ground or landing strip, for providing a signal indicative of the algebraic sum of the inputs thereto. The function generators provide proper scaling or signal shaping as a function of time for the associated inputs provided to summing means 24.

First and second fixed gain means 26 and 27, corresponding to terms $K_1$ and $K_2$ respectively in Equation 9, are interposed between summing means 24 and altitude sensor 25 and time drive means 16 respectively to provide proper scaling of the associated inputs to element 24. Such fixed gain elements may be comprised of potentiometers or other means well known to those skilled in the art.

The output of summing means 24 is connected to the input of integrator 17, which generates a present descent rate reference signal indicative of the predicted terminal control errors.

A switch 28 having a flare and pre-flare state is used to control the operation of the system, including the time drive means 16. Operation of switch 28 (by means not shown) turns the time drive means on and off in the flare and pre-flare states respectively. In the pre-flare state the illustrated portion of switch 28 provides a feedback signal to the input of integrator 17 from the output of element 23. The purpose of such connection is to cause the integrator to generate an output signal opposing the altitude rate sensor signal, as to result in a null in the output of element 23. This null condition in the pre-flare mode assures that no untoward disturbing inputs will be experienced by flight controller 29 when the terminal prediction computer is made operative (e.g., when switch 28 is switched to the flare state). In other words, the initial condition on integrator 17 is always synchronized with the output from sensor 25 at switch-over to "flare".

In the operation of the described device of FIG. 4, suitable auxiliary systems (not shown and not a part of this invention) such as those employing GCA or ILS, for example, are employed to control the aircraft down a glide slope to a suitable position relative to a runway and in a suitable orientation such that a landing flare-out maneuver may be safely attempted. Further, the initial time-to-go interval ($\Delta t = T - t_o$, where $t_o$ is the instant that the terminal prediction controller is turned on) is established by auxiliary computation (not shown) such as dividing initial range by range-rate or by other suitable means well known in the art.

The flare-out maneuver is commenced by turning switch 28 to the "flare" position, thereby turning on time drive means 16, removing the feedback signal to integrator 17 from comparison means 23 and connecting the output of comparison means 23 to flight controller 29. Initially, the control signal input to flight controller 29 from comparison means 23 is zero, as explained above, the control signal output building up in time under the action of integrator 17 in cooperation with the output from summing means 24.

The effect of the signal from altitude sensor 25 to summing means 24 is to tend to cause the airplane to be controlled so as to reduce the output from sensor 25 to zero (e.g., cause the airplane to continue a downward descent). The effect of the time drive signal $(T-t)$ from element 16 to summing means 24 is to provide a constantly decreasing bias to the altitude signal from elements 25 and 26, in order to assist initial altitude control action in achieving a flare-out maneuver (of successively decreasing descent rate) which terminates in a touchdown by the specified time, T. As the time-to-go interval $(T-t)$ approaches zero, the contribution of element 16 to the control action reduces to zero.

The effect of the output from first function generator 18 is to provide a present control signal component that is required to be added to the existing output at integrator 17 in order to provide the desired terminal values of altitude and altitude rate (rate-of-descent) at terminal time T.

The effect of the output from second function generator 19 is to provide an additional compensatory control signal due to a lack of correspondence between the present sink rate reference signal from element 17 and the aircraft rate-of-descent performance as measured by sensor 22. Such lack of correspondence may arise, for example, from transient delays of the vehicle dynamic response, or from zero order error coefficients characteristics of the vehicle control loop, or from gain tolerances of the elements of the terminal prediction computer itself.

By means of further manipulation of Equation 9, several alternate embodiments to the device of FIG. 4 may be realized. Repeating Equation 9 here for convenience as Equation 10:

$$\ddot{h}_c = H_1 \ddot{h}_e + H_2(\dot{h} - \dot{h}_T) + hK_1 + K_2(T-t) \quad (10)$$

Substituting $(\dot{h} - \dot{h}_c)$ for $\ddot{h}_e$:

$$\ddot{h}_c = H_1(\dot{h} - \dot{h}_c) + H_2(\dot{h} - \dot{h}_T) + hK_1 + K_2(T-t) \quad (11)$$

Rearranging terms:

$$\ddot{h}_c = H_3(\dot{h} - \dot{h}_T) + H_1(\dot{h}_T - \dot{h}_c) + hK_1 + K_2(T-t) \quad (12)$$

where:

$$H_3 = H_1 + H_2$$

Figure 5:
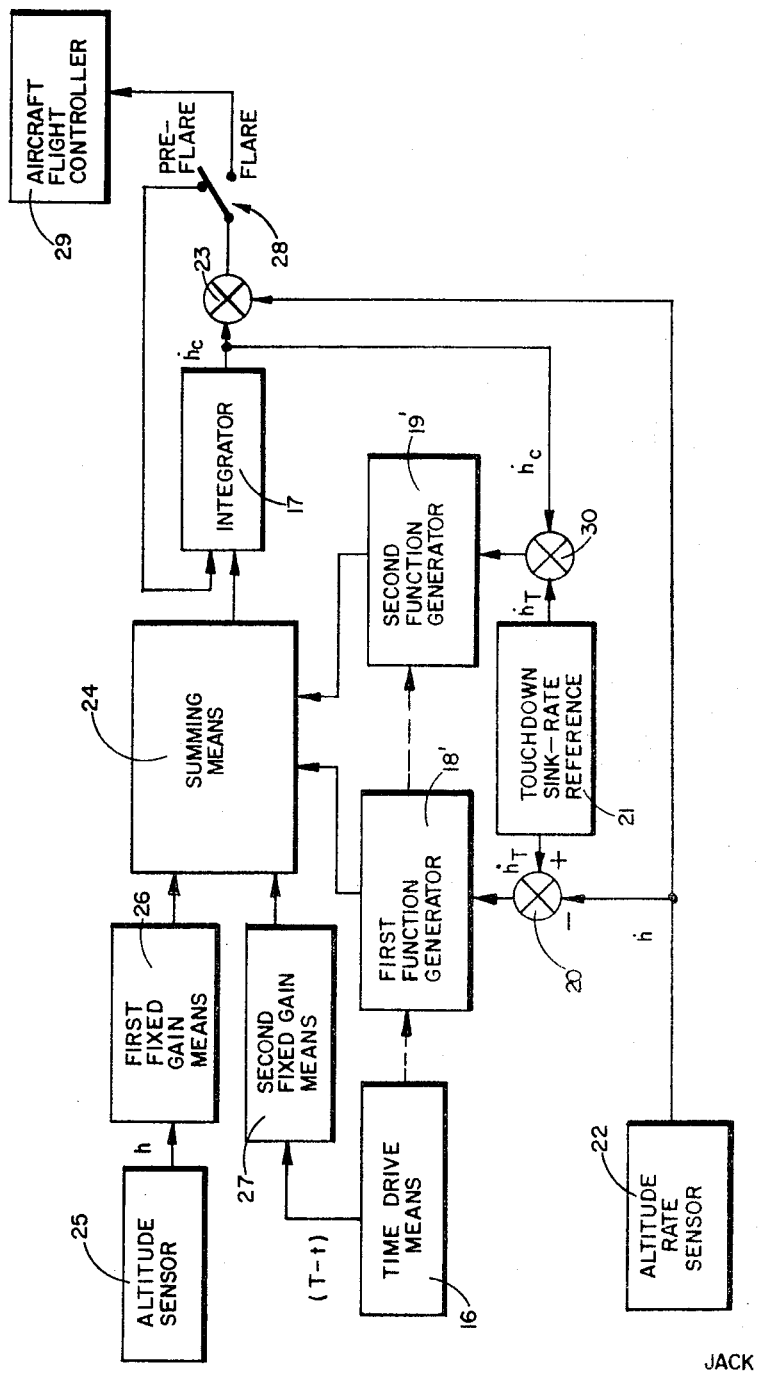
FIG. 5 is a functional block diagram of an alternate embodiment of the invention.

Equation 12 represents an alternate equation to Equation 9, the mechanization of Equation 12 also only requiring two function generators ($H_1$ and $H_3$), as illustrated in FIG. 5.

Referring to FIG. 5, there is illustrated a functional block diagram of an alternate embodiment of the device of this invention. There is provided a time drive mechanism 16 for providing signals indicative of the time interval $(T-t)$, including a mechanical output for commonly driving first and second function generators 18' and 19'.

First function generator 18', corresponding to term $H_3$ of Equation 12 is responsively connected to a signal source indicative of the difference between the specified rate of descent at touchdown ($\dot{h}_T$) and the present rate of descent ($\dot{h}$). Such signal source is comprised of first comparison means 20 responsively connected to a touchdown sink rate reference 21 and the output of an altitude rate sensor 22 for providing a signal indicative of the difference therebetween.

Second function generator 19', corresponding to term $H_1$ of Equation 12, is connected to a second signal source indicative of the difference between the specified rate of descent at touchdown ($\dot{h}_T$) and a computed output signal ($\dot{h}_c$). Such signal source is comprised of comparison means 30 responsively connected to the output of integrator 17 and the output of reference element 21 for providing a signal indicative of the difference therebetween.

A summing device 24 is responsively connected to the output of function generators 18' and 19', time drive means 16 and altitude sensor 25. First and second fixed gain terms 26 and 27, corresponding to terms $K_1$ and $K_2$ respectively in Equation 12, are interposed between summing means 24 and altitude sensor 25 and time drive means 16 respectively. The output of summing means 24 is connected to the input of integrator 17. Summing means 23 is responsively connected to integrator 17 and altitude rate sensor 22 to provide a control signal ($\dot{h}_e$) indicative of the difference between the computed output signal ($\dot{h}_c$) from element 17 and the current rate of descent signal ($\dot{h}$) from element 22.

The device of FIG. 5 employs no more than two arbitrary function generators, similar to the embodiment illustrated in FIG. 4. However, the embodiment of FIG. 5 requires one more summing means than the device of FIG. 4. Hence, the embodiment of FIG. 4 is to be preferred over that of FIG. 5.

In both of the devices of FIG. 4 and FIG. 5, as described by Equations 9 and 12 respectively, an integrator is required to complete the computation of the terminal prediction control signal, $h_e = \dot{h}_c - \dot{h}$, (where $\dot{h}_c = \int \ddot{h}_c dt$).

By means of further manipulation of Equation 12, an alternate embodiment may be evolved which does not employ an integrator as a computer element, but employs a simpler device which, however, similarly displays a transfer function fixed with respect to time.

Repeating Equation 12 here as Equation 13 for convenience:

$$\ddot{h}_c = H_3(\dot{h} - \dot{h}_T) + H_1(\dot{h}_T - \dot{h}_c) + K_1 h + K_2(T-t) \quad (13)$$

For convenience, consider the arbitrary function $H_1$ to be describable in terms of an additional arbitrary function ($H_4$), time-to-go, and a constant $K_4$,
Let:
$$H_1 = H_4 + (T-t) + K_4 \quad (14)$$
Similarly, let:
$$H_3 = -(K_3 + H_5) \quad (15)$$
Similarly
$$K_2 = +\dot{h}_T K_5 \quad (16)$$

where $\dot{h}_T$ is preselected, and $K_5$ is uniquely defined by the relation $K_2/\dot{h}_T$. Substituting Equations 14, 15 and 16 into Equation 13:

$$\ddot{h}_e = -(K_3 + H_5)(\dot{h} - \dot{h}_T) + [H_4 + (T-t) + K_4](\dot{h}_T - \dot{h}_c) \\ + K_1 h + \dot{h}_T K_1 (T-t) \quad (17)$$

Rearranging Equation 17:

$$\ddot{h}_c = \dot{h}(-K_3 - H_5) + \dot{h}_T[K_3 + H_5 + H_4 + K_4 + (T-t) + K_5 \\ (T-t)] - \dot{h}_c[H_4 + (T-t) + K_4] + K_1 h \quad (18)$$

Separating the arbitrary function terms from the rest of the terms of Equation 18, and substituting $K_6$ for ($K_3 + K_4$), and $K_7$ for ($1 + K_5$):

$$\ddot{h}_c = K_3 \dot{h} + K_6 \dot{h}_T + \dot{h}_T K_7 (T-t) - K_4 \dot{h}_c + K_1 h - \dot{h}_c(T-t) \\ + H_5(\dot{h}_T - \dot{h}) + H_4(\dot{h}_T - \dot{h}_c) \quad (19)$$

Recalling that $\dot{h}_c$ is the first derivative of $h_c$, or in Laplace notation, $\ddot{h}_c = s\dot{h}_c$, and collecting $\dot{h}_c$ terms having constant coefficients:

$$\dot{h}_c(s + K_4) = -K_3 \dot{h} + K_6 \dot{h}_T + \dot{h}_T K_7 (T-t) + h K_1 - \dot{h}_c(T-t) \\ + H_5(\dot{h}_T - \dot{h}) + H_4(\dot{h}_T - \dot{h}_c) \quad (20)$$

Dividing both sides of Equation 20 by the transfer function ($s + K_4$):

$$\dot{h}_c = \frac{1}{(K_4 + S)}[-K_3 \dot{h} + K_6 \dot{h}_T + \dot{h}_T K_7 (T-t) + h K_1 \\ - \dot{h}_c(T-t) + H_5(\dot{h}_T - \dot{h}) + H_4(\dot{h}_T - \dot{h}_c)] \quad (21)$$

Figure 6:
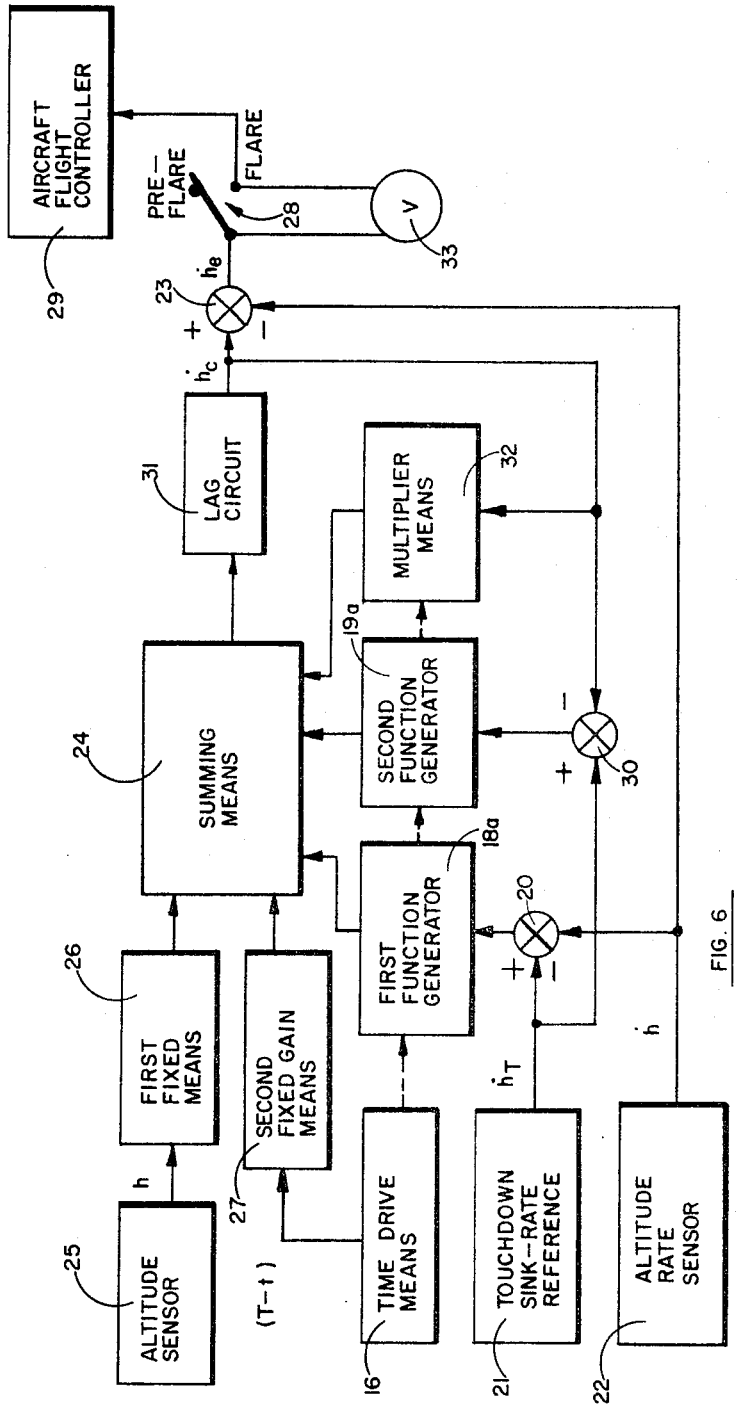
FIG. 6 is a second alternate embodiment of the invention.

Equation 21 represents an alternate equation to Equations 9 and 12. The mechanization of Equation 21 requires only two arbitrary function generators ($H_4 + H_5$), and in addition substitutes a lag network $$\left(\frac{1}{K_4 + S}\right)$$

for the output integrator 17 of FIGS. 3 and 4, as illustrated in FIG. 6. It is to be appreciated that for high frequency signal components (e.g., $s = jwK_4$) the network transfer function behaves in the same fashion as integrator 17 of FIGS. 4 and 5.

Referring to FIG. 6, there is illustrated a functional block diagram of another alternate embodiment of the device of this invention, showing the mechanization of Equation 21. The device illustrated in FIG. 6 is comprised of similar components similarly arranged as those of FIG. 5, but with the following noted differences. A first order time lag circuit 31, corresponding to the transfer function $$\left(\frac{1}{K_4 + S}\right)$$

of Equation 21, is substituted for integrator 17 of FIGS. 4 and 5. Because of the use of a lag transfer function $$\left(\frac{1}{K_4 + S}\right)$$

for the fixed transfer function element for computing the signal $\dot{h}_c$, the simpler and more reliable electronic device of a network may be substituted for the bulky electromechanical or integrating motor assemblies usually employed for the integrator function of element 17 in FIGS. 4 and 5. Also, multiplier means 32 is added for multiplying the computed reference signal $\dot{h}_c$ by the term $(T-t)$, as indicated in Equation 21. Further, time drive means 16 (for providing a signal indicative of $(T-t)$) includes a common mechanical output for driving multiplier means 32, in addition to driving first and second function generators 18a and 19a. Such multiplier means may be comprised of a linearly-wound potentiometer, driven by the time drive means 16, and excited by a signal source indicative of $\dot{h}_c$. Thus, the input to the potentiometer is attenuated as a function of the time drive shaft position (corresponding to $(T-t)$), as to provide a signal indicative of the product $\dot{h}_c(T-t)$.

First function generator 18a, corresponding to term $H_5$ of Equation 21, represents a modification of the arbitrary function represented by function generator 18' of FIG. 5, and is responsively connected to a signal source indicative of the term $(\dot{h}_T - \dot{h})$ of Equation 21. Such signal source is comprised of first comparison means 20 responsively connected to compare the output from altitude rate sensor 22 with the reference signal from reference 21.

Second function generator 19a, corresponding to term $H_4$ of Equation 21, represents a modification of the arbitrary function represented by function generator 19' of FIG. 5, and is responsively connected to a signal source indicative of the term $(\dot{h}_T - \dot{h}_c)$ of Equation 21. Such signal source is comprised of comparison means 30 responsively connected to compare the output from element 22 with that from lag circuit 31.

Summing device 24 is responsively connected to the output of each of elements 16, 18a, 19a, 32 and altitude sensor 25. First and second fixed gain means 26 and 27, corresponding to terms $K_1$ and $\dot{h}_T K_7$ respectively in Equation 21, are interposed between element 25 and element 16 respectively to provide proper scaling of the associated inputs to element 24. The output from element 24 is operatively connected to the input of lag circuit 31 which processes the summed signals from element 24 to provide a present descent rate reference signal corresponding to the term $\dot{h}_c$ in Equation 21.

A switch 28 having a flare and pre-flare state is used to control the operation of the system, including time drive means 16. The embodiment of FIG. 6, however, does not demonstrate the null signal feature in initial operation, whereby flight controller 29 may avoid being subjected to initial disturbance inputs upon switching on the system. Such lack of this feature, as illustrated, is not critical, however; and may be compensated for through the use of proper flight trimming procedures whereby the terminal predictor control signal $\dot{h}_e$ due to the sensor outputs from elements 25 and 22 (e.g., $\dot{h}$ and $-h$) prior to turning on time drive means 16 (e.g., switch 28 is in the pre-flare position) is nulled, as indicated by a galvanometer 33 or like means connected across the terminals of switch 28.

The time drive means 16 is a critical component common to all of the embodiments of the terminal prediction controller. Accordingly, a description of an exemplary mechanization of such device is included herein in order to demonstrate more fully the economy and engineering simplifications provided by the device of the subject invention. Such exemplary mechanism is shown in FIG. 7.

Figure 7:
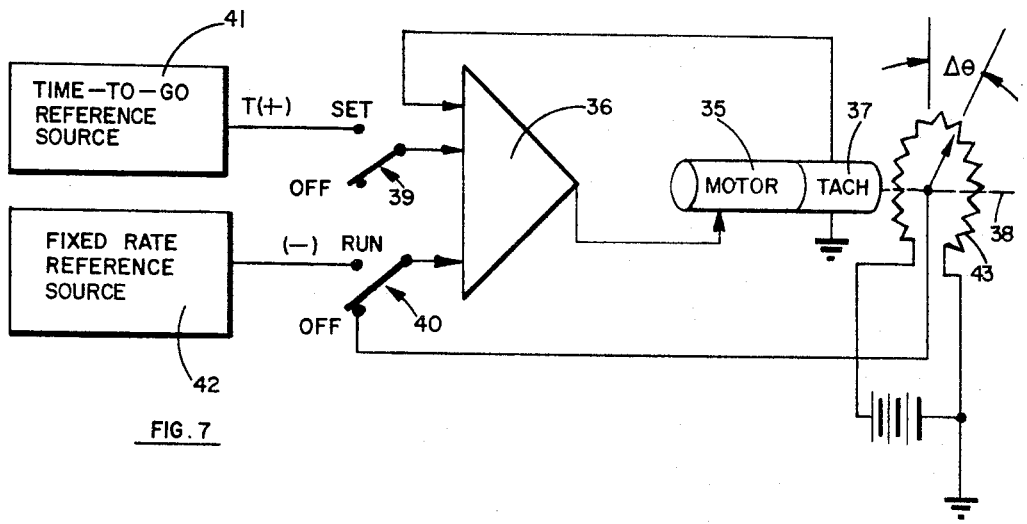
FIG. 7 is a functional block diagram of a time drive mechanism.

Referring to FIG. 7, there is illustrated a functional block diagram of an exemplary mechanization of time drive means 16. There is provided a closed loop constant speed motor drive comprising a motor 35 responsively coupled to a summing amplifier 36, and a tachometer generator 37 operatively cooperating with shaft 38 of motor 35, an input to summing amplifier 36 being responsively connected to the output from tachometer 37.

A first and a second switch 39 and 40 are connected for providing additional inputs to summing amplifier 36. A time-to-go-reference signal source 41 is coupled to the input of amplifier 36 by means of first switch 39, to provide a signal indicative of the initial time-to-go term T in the expression $(T-t)$ of Equation 9. Double throw switch 40 is operatively arranged to alternatively connect fixed rate reference 42 and the output from a shaft position pick off potentiometer 43 to the input of amplifier 36. The "run" position of switch 40, connecting element 43, corresponds to the "flare" position of switch 28 in FIGS. 4, 5 and 6.

When the device of FIG. 7 is not in direct use, first switch 39 is open and second switch 40 is connected to potentiometer 43, as shown. Thus, the device acts as a position servo with zero input reference, and output shaft 38 is servoed or maintained at an angular position corresponding to the null signal input. In normal operation of the device of FIG. 7, first switch 39 is initially closed during the equipment warm up interval, thereby connecting the time-to-go signal to the inuput of amplifier 36, in addition to the position feedback signal provided by second switch 40 from potentiometer 43. The arrangement of the device of FIG. 7 thus acts as a closed loop positional servo system, the motor operating to turn shaft 38 until the negative feedback signal from potentiometer 43 equals the positive bias signal from element 41. Hence, shaft 38 is positioned at an angular position $\theta_T$ indicative of the time-to-go T. During such positioning of the shaft, the negative feedback rate signal from tachometer 37 acts to damp or stabilize the position feedback loop control action.

Then (when the aircraft is at the desired initial position for commencing the flare-out maneuver and with the first switch 39 opened), second switch 40 is switched from its initial state to the run or operate state, thereby disconnecting the position feedback loop and substituting the output from a preselected reference signal source 42 to the input of amplifier 36. The sense of such signal from rate reference source 42 is opposite to that of first reference source 41. Thus, the only feedback signal input to amplifier 36 is that from tachometer 37, and the device of FIG. 7 is made to operate as a rate servo in such a direction as to rotate the shaft 38 back through the angle $\theta_T$ toward the initial null position.

Since the rate reference input from source 42 is fixed, the rate servo runs at a constant speed whereby the departure position $\theta_t$ of shaft 38 from the set position $\theta_T$ (e.g., $\Delta\theta = \theta_T - \theta_t$) is analogous to the passage of time, and hence is indicative of the term $(T-t)$ in Equation 9. As the shaft continues to turn, it approaches that position corresponding to the position pickoff potentiometer electrical null (e.g., the term $(\theta_T - \theta_t)$ approaches zero, indicating that the time-to-go interval $(T-t)$ is approaching zero). Hence, while serving as a positional servo feedback element in the warm-up mode of the time drive means illustrated in FIG. 7, position potentiometer 43 is also useful for providing the time-to-go signal in the operative mode of the time drive means. Hence, potentiometer 43 serves a dual function. In other words, the electrical time-to-go signal $(T-t)$ may be obtained from time drive means 16 for use in the several illustrated embodiments of the terminal prediction computer without the addition of any special signal generating elements.

Figure 8:
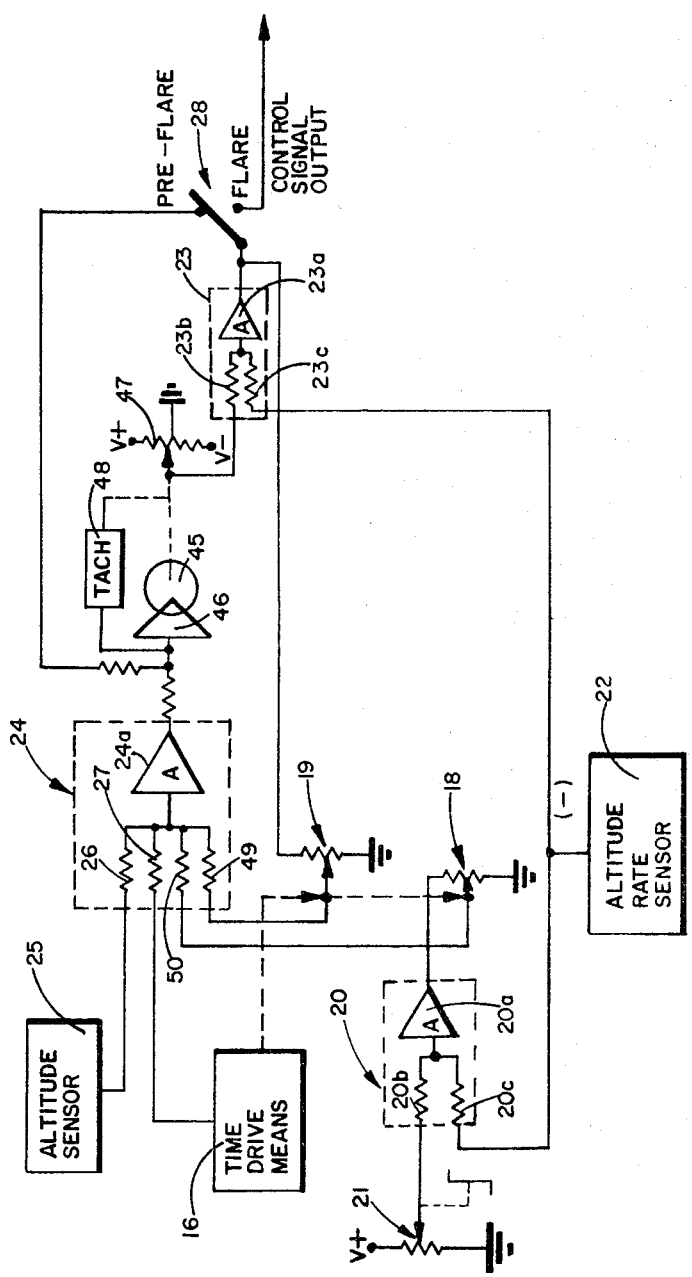
FIG. 8 is an exemplary schematic diagram of the device of FIG. 4.

In an exemplary mechanization of the system illustrated in FIG. 4, several of the functional blocks are combined, such as the combination of gain elements 26 and 27 within summing amplifier 24, is is shown in FIG. 8.

Referring to FIG. 8, there is illustrated an exemplary schematic diagram of the block diagram of FIG. 4. There is provided a time drive mechanism 16 of the type described and illustrated in FIG. 7. The electrical output signal from element 16 (at the wiper of potentiometer 43, for example) is summed with the output from an altitude sensor 25 by means of summing means 24. The form of the altitude sensor employed is known to those skilled in the art, does not constitute a novel aspect of the invention, and is therefore shown in block diagram form only.

Summing means 24 is comprised of a summing amplifier 24a and an input summing network which includes a summing resistor 26 in series with the output from altitude sensor 25 and another summing resistor 27 in series with the electrical input from time drive means 16. The resistance value selected for each of resistors 26 and 27 also establishes the gain level of the signal so summed by such resistor. Accordingly, resistors 26 and 27 perform the gain function of first and second fixed gain means respectively of FIG. 4.

The output of summing means 24 is applied to the input of an integrator assembly comprised of an integrating motor 45 driven by power amplifier 46. The mechanical output from motor 45 is employed to drive a position pick-off potentiometer 47 and a tachometer generator 48. Tachometer generator 48 provides a negative feedback signal indicative of the velocity of motor 45 which, in operation, is nulled against the input signal from summing means 24. Accordingly, the velocity of motor 45 is substantially proportional to the magnitude of the input signal from summing means 24. Potentiometer 47, in providing a signal indicative of shaft position (e.g., the time integral of the velocity of motor 45), generates an output signal which is proportional to the first time integral of the input signal from summing means 24.

The output signal from integrator potentiometer 47 is combined with the output from altitude rate sensor 22 by summing means 23 which may be similar to summing amplifier 24. The structure of altitude rate sensor 22 employed is known to those skilled in the art, does not constitute a novel aspect of the invention, and is therefore shown for convenience in block diagram only. Summing means 23 is comprised of summing amplifier 23a and an input summing network formed by summing resistors 23b in series with the output from potentiometer 47, and summing resistor 23c in series with the output from sensor 22. The sense of the signal from sensor 22 is so selected relative to that from potentiometer 47, that the output from summing means 23 is indicative of the amplitude difference between the inputs thereto, corresponding to the term $h_e$.

Figure 9:
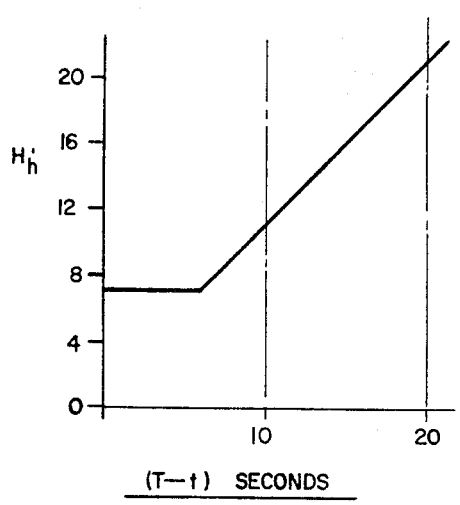
FIG. 9 is a graph of the response of functional generator 18 of FIG. 4.
Figure 10:
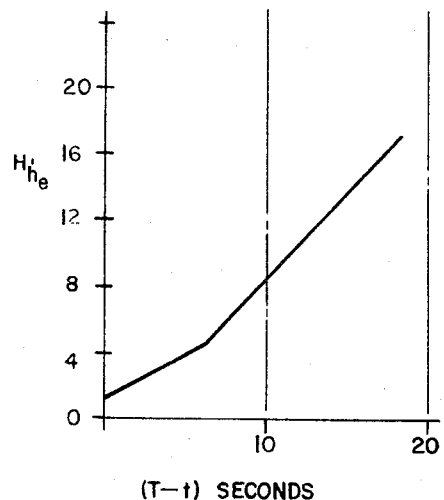
FIG. 10 is a graph of the response of function generator 19 of FIG. 4.

There are also two function generators 18 and 19, each comprised of a non-linearly wound potentiometer in a driven relationship with the mechanical output from time drive means 16. Exemplary functions provided by each of potentiometers 18 and 19 are shown in FIGURES 9 and 10 respectively.

Potentiometer 19, corresponding to the second function generator of FIG. 4, is excited by the $h_e$ signal output from summing means 23 to provide an output signal proportional to $h_e$ multiplied by (e.g., attenuated by) the non-linear function (shown in FIG. 10 and provided by potentiometer 19) as a function of time-to-go, as represented by FIG. 4. The output of potentiometer 19 is fed to a summing resistor 46 of summing means 24.

Potentiometer 18, corresponding to the first function generator of FIG. 4, is excited by a signal indicative of the difference between a present rate of descent and a desired terminal descent rate $(\overset{*}{h}_T - \overset{*}{h})$. Such desired terminal descent rate signal $\overset{*}{h}_T$ is provided by a manually settable potentiometer 21 excited by a source of constant potential, which potentiometer corresponds to the touchdown sink-rate reference of FIG. 4. The output from potentiometer 21 is summed with that from sensor 22 by summing means 20. Summing means 20 is comprised of summing amplifier 20a and an input summing network formed by summing resistor 20b in series with the output from potentiometer 21 and summing resistor 20c in series with the output from sensor 22. The sense of the output from potentiometer 21 relative to that of sensor 22 is selected such that the output from summing means 20 is indicative of the amplitude difference between the inputs thereto. The excitation source for potentiometer 18, corresponding to the term ($h_T-h$) is attenuated by the non-linear function potentiometer as a function of time-to-go as represented by FIG. 9. The output of potentiometer 18 is fed to summing resistor 50 of summing means 24.

The several illustrated embodiments of the concept of the invention provide a relatively simple mechanization for achieving two-condition terminal prediction control, requiring no more than two arbitrary function generators, one of which is responsive to a signal indicative of the difference between a terminal sink rate reference and the present descent rate of the aircraft.

Hence, it is to be seen that improved computational means is provided for two-condition terminal prediction control of an aircraft flare-outstanding maneuver. With the device of the invention has been described with reference to an aircraft landing system, it is to be appreciated that the principles of the invention may be readily applied to any physical system requiring two-condition terminal prediction control.

Although this invention has been described and illustrated in detail, it is to be clearly understood that the same is by way of illustration and example only and is not to be taken by way of limitation, the spirit and scope of this invention being limited only by way of the terms of the appended claims.

I claim:

1. A terminal prediction controller for effecting a terminal condition of a controlled element at a preselected terminal instant in time comprising sensor means for measuring rate of change of a condition, time-drive means for providing an output indication of the time interval remaining until said preselected terminal instant, reference means indicating a desired terminal rate of change of said condition, first function generator means driven by said time-drive means and responsive to said sensor and reference means for generating a first signal representing a predetermined time function of the difference between measured rate of change of said condition and said desired terminal rate of change of said condition, second function generator means driven by said time-drive means for generating a second signal representing a predetermined time function of a computed rate of change of said condition, computing means responsive to said first and second signals for providing said computed rate of change of said condition, and means for comparing said computed rate of change of condition with said measured rate of change of condition.

2. A two-condition terminal prediction controller having an output terminal for providing a control signal to a controlled element, and comprising: a plurality of arbitrary function generators consisting of first and second function generators driven by a common time drive mechanism, said time drive mechanism providing signals indicative of the time interval remaining until a predetermined terminal instant, one of said function generators being responsively connected to a source of signals indicative of the difference between the rate of change of response of said controlled element and a desired terminal rate of change and the other of said function generators being responsively connected to said output terminal for processing signals indicative of the control signal output from said controller; summing means responsive to said function generators and to said mechanism time interval signals for providing a signal indicative of the inputs thereto; and electrical means responsive to said summing means and having a transfer function fixed with respect to time for providing said control signal, whereby a zero magnitude first terminal condition of said controlled element and a preselected finite terminal rate of change of said first terminal condition are achieved for said terminal instant.

3. In an aircraft having a closed loop altitude rate flight controller, a two-condition terminal prediction computer for providing a control signal for controlling the descent of said aircraft in a predetermined manner, comprising: a time drive mechanism for providing an indication of time interval remaining until a predetermined instant for which a touchdown landing of the aircraft is desired; arbitrary function generators, consisting of a first and second arbitrary function generator, said first arbitrary function generator being driven by said time drive mechanism and responsively coupled to a first signal source indicative of the difference between the present sink rate of descent of said aircraft and the desired touchdown sink rate for providing a descent rate reference signal component; said second arbitrary function generator being driven by said time drive mechanism and responsively coupled to a second signal source indicative of the difference between the present rate of descent and a computed present rate of descent reference, altitude signal means for providing a signal indicative of the difference between the present altitude of said aircraft and the touchdown altitude; summing means responsive to said time drive means, said first arbitrary function generator, said altitude signal means and said second arbitrary function generator; integrator means responsively connected to said summing means for providing a signal indicative of said computed present rate of descent reference, whereby said aircraft is controlled asymptotically to a point of touchdown within a specified time interval and at a touchdown rate within a specified maximum rate of descent.

4. In an aircraft having a closed loop altitude rate flight controller, a two-condition terminal prediction computer for providing a control signal for controlling the descent of said aircraft in a predetermined manner, comprising: a time drive mechanism for providing an indication of time interval remaining until a predetermned instant for which a touchdown landing of the aircraft is desired; function generators, consisting of a first and second function generator, said first function generator being driven by said time drive mechanism and responsively coupled to a first signal source indicative of the difference between the present sink rate of said aircraft and the desired touchdown sink rate; altitude signal means for providing a signal indicative of the difference between the present altitude of said aircraft and the touchdown altitude; summing means responsive to said time drive means, to said first function generator, to said altitude signal means and to said second function generator; output means responsively connected to said summing means and having a transfer function fixed with respect to time which integrates at least at high frequencies for providing a signal indicative of computed present rate of descent reference, whereby said aircraft is controlled asymptotically to a point of touchdown within a specified time interval and at a touchdown rate within a specified maximum rate of descent.

5. In an aircraft having a closed loop altitude rate flight controller, a two-condition terminal prediction computer for providing a control signal for controlling the descent of said aircraft in a predetermined manner, comprising: a time drive mechanism for providing an indication of time interval remaining until a predetermined instant; function generators, consisting of a first and second function generator, said first arbitrary function generator being driven by said time drive mechanism and responsively coupled to a first signal source indicative of the difference between the present sink rate of said aircraft and the desired touchdown sink rate for providing a descent rate reference signal component; altitude signal means for providing a signal indicative of the difference between the present altitude of said aircraft and the touchdown altitude; a second arbitrary function generator driven by said time drive mechanism and responsively coupled to a second signal source indicative of the difference between the desired touchdown sink rate and a computed present rate of descent reference, summing means responsive to said time drive means, said first arbitrary function generator, said altitude signal means and said second arbitrary function generator; a first order lag circuit responsively connected to said summing means for providing a signal indicative of said computed present rate of descent reference, whereby said aircraft is controlled asymptotically to a point of touchdown within a specified time interval and at a touchdown rate within a specified maximum rate of descent.

6. In an aircraft having a closed loop altitude rate flight controller, a two-condition terminal prediction computer for providing a control signal for controlling the descent of said aircraft in a predetermined manner, comprising: a time drive mechanism for providing an indication of time interval remaining until a predetermined instant; arbitrary function generators, consisting of a first and second arbitrary function generator, said first arbitrary function generator being driven by said time drive mechanism and responsively coupled to a first signal source indicative of the difference between the present sink rate of said aircraft and the desired touchdown sink rate for providing a descent rate reference signal component, said second arbitrary function generator driven by said time drive mechanism and responsively coupled to a second signal source indicative of the difference between the desired touchdown sink rate and a computed present rate of descent reference; altitude signal means for providing a signal indicative of the difference between the present altitude of said aircraft and the touchdown altitude; summing means responsive to said time drive means, said first arbitrary function generator, said altitude signal means and said second arbitrary function generator; output means responsively connected to said summing means and having a transfer function fixed with respect to time which integrates at least at high frequencies for providing a signal indicative of said computed present rate of descent reference, whereby said aircraft is controlled asymptotically to a point of touchdown within a specified time interval and at a touchdown rate within a specified maximum rate of descent.

7. In a rate of descent control system, a terminal prediction computer for continuously computing a present descent rate reference signal for controlling an aircraft to a touchdown point within a specified time interval and providing a specified touchdown rate of descent, comprising a source of a present descent rate signal; no more than two arbitrary function generators driven by a time drive means, said time drive means providing signals indicative of the time intervals remaining until a predetermined instant, a first one of said function generators being responsively connected to a signal source indicative of the difference between the specified touchdown descent rate and the present descent rate of said aircraft, a second one of said function generators being responsively connected to a signal source indicative of the difference between the specified touchdown descent rate and the present descent rate reference; multiplier means for obtaining a signal indicative of the product of the output signal from said drive means and the present descent rate reference signal; summing means responsive to said function generators, said multiplier means, said time drive mechanism and a signal source indicative of the present altitude of said aircraft relative to the touchdown point for providing a signal indicative of the sum of the input thereto; and a first order lag output element responsive to the output of said summing means for providing said present descent rate reference.

8. In a rate of descent control system, a terminal prediction computer for continuously computing a present descent rate reference signal for controlling an aircraft to a touchdown point within a specified time interval and providing a specified touchdown rate of descent comprising: no more than two arbitrary function generators driven by a time drive means; said time drive means providing signals indicative of the time interval remaining until a predetermined instant; a first one of said function generators being responsively connected to a signal source indicative of the difference between the specified touchdown descent rate and the present descent rate of said aircraft; a second one of said function generators being responsively connected to a signal source indicative of the difference between the specified touchdown descent rate and the present descent rate reference; summing means responsive to said function generators, said time drive mechanism and a signal source indicative of the present altitude of said aircraft relative to the touchdown point for providing a signal indicative of the sum of the input thereto; and an integrator responsive to the output of said summing means for providing said present descent rate reference.

9. In a closed loop rate of descent control system, a terminal prediction computer for continuously computing a present descent rate reference signal for controlling an aircraft to a touchdown point within a specified time interval and providing a specified touchdown rate of descent, comprising: a plurality of arbitrary function generators driven by a time drive means; said time drive means providing signals indicative of the time interval remaining until a predetermined instant; a first one of said function generators being responsively connected to signal source indicative of the difference between the specified touchdown descent rate and the present descent rate of said aircraft; a second one of said function generators being responsively connected to a signal source indicative of at least the computed present descent rate reference; summing means responsive to said function generators, said time drive mechanism and a signal source indicative of the present altitude of said aircraft relative to the touchdown point for providing a signal indicative of the sum of the input thereto; and an output element responsive to the output of said summing means and having a fixed transfer function which integrates at least at high frequencies for providing said present descent rate reference.

10. In a closed loop rate of descent control system, a terminal prediction computer for continuously computing a present descent rate reference signal for controlling an aircraft to a touchdown point within a specified time interval and providing a specified touchdown rate of descent, comprising: a plurality of arbitrary function generators, consisting of two function generators driven by a time drive means; said time drive means providing signals indicative of the time interval remaining until a predetermined instant; a first one of said function generators being responsively connected to a signal source indicative of the difference between the specified touchdown descent rate and the present descent rate of said aircraft; a second one of said function generators being responsively connected to a signal source indicative of at least the computed present descent rate reference; summing means responsive to said function generators, said time drive mechanism and a signal source indicative of the present altitude of said aircraft relative to the touchdown point for providing a signal indicative of the sum of the input thereto; and an integrator responsive to the output of said summing means for providing said present descent rate reference.

11. In a terminal prediction landing system, a computer for continuously computing a control signal for controlling an aircraft to a touchdown point within a specified time interval and providing a specified touchdown rate-of-descent, comprising: no more than two arbitrary function generators driven by a common time drive mechanism; said time drive mechanism providing signals indicative of the time interval remaining until a predetermined time instant; one of said function generators being responsively connected to a first signal source indicative of the difference between the specified touchdown descent rate and the present descent rate of said aircraft; the other of said function generators being responsively connected to a second signal source indicative of the difference between a present descent rate reference and said specified touchdown descent rate; summing means responsive to said two function generators, said time drive mechanism and a third signal source indicative of the present altitude of said aircraft relative to the touchdown point for providing a signal indicative of the sum of the inputs thereto; and output means responsive to the output of said summing means and having a fixed transfer function which integrates at least at high frequencies for providing said present descent rate reference, and comparison means for comparing said present descent rate with said present descent rate reference to provide said control signal.

12. In a terminal prediction landing system, a computer for continuously computing a control signal for controlling an aircraft to a touchdown point within a specified time interval and providing a specified touchdown rate-of-descent, comprising: no more than two arbitrary function generators driven by a common time drive mechanism; said time drive mechanism providing signals indicative of the time interval remaining until a predetermined time instant; one of said function generators being responsively connected to a first signal source indicative of the difference between the specified touchdown descent rate and the present descent rate of said aircraft; the other of said function generators being responsively connected to a second signal source indicative of the difference between a present descent rate reference and said specified touchdown descent rate; summing means responsive to said two function generators, said time drive mechanism and a third signal source indicative of the present altitude of said aircraft relative to the touchdown point for providing a signal indicative of the sum of the inputs thereto; and an integrator responsive to the output of said summing means for providing said present descent rate reference, and comparison means for comparing said present descent rate with said present descent rate reference to provide said control signal.

13. In a terminal prediction landing system, a computer for continuously computing a control signal for controlling an aircraft to a touchdown point within a specified time interval and providing a specified touchdown rate of descent, comprising: a plurality of arbitrary function generators driven by a common time drive mechanism; said time drive mechanism providing signals indicative of the time interval remaining until a predetermined time instant; one of said function generators being responsively connected to a first signal source indicative of the difference between the specified touchdown descent rate and the present descent rate of said aircraft; the other of said function generators being responsively connected to a second signal source indicative of the difference between a present descent rate reference and said present descent rate of said aircraft; summing means responsive to said two function generators, said time drive mechanism and a third signal source indicative of the present altitude of said aircraft relative to the touchdown point for providing a signal indicative of the sum of the inputs thereto; and an integrator responsive to the output of said summing means for providing said present descent rate reference, and comparison means for comparing said present descent rate with said present descent rate reference to provide said control signal.

14. A two-condition terminal prediction landing system comprising, means for sensing altitude ($h$) and altitude rate ($\dot{h}$), time-drive means for providing signals indicating remaining time-to-go ($T-t$) until a preselected terminal instant of time (T); combining means responsive to sensed altitude and altitude rate for providing an altitude acceleration command signal ($\ddot{h}_c$) required to adjust both altitude rate and altitude to a desired value at said future time T, combining means responsive to said sensing means and time-drive means for preselectively combining the outputs thereof in accordance with the relationship $\ddot{h}_o = H_1 \dot{h}_e + H_2(\dot{h} - \dot{h}_T) + h K_1 + K_2(T-t)$ where:

$\ddot{h}_c$ = altitude acceleration command required to adjust the final value of both altitude and altitude rate
$K_1$ = a first gain constant
$K_2$ = a second gain constant
$h$ = altitude
$\dot{h}$ = altitude rate
$\dot{h}_T$ = desired terminal altitude rate
$\dot{h}_e$ = altitude rate error
$T$ = flare interval
$t$ = real time
$(T-t)$ = time-to-go
$H_1$ = system altitude rate error weighting function
$H_2$ = system altitude rate weighting function means for integrating said command signal $\ddot{h}_c$, and means responsive to the integrating means and to the altitude rate sensing means for deriving a control signal.

15. A two-condition terminal prediction landing system comprising means for sensing altitude ($h$) and altitude rate ($\dot{h}$); time-drive means providing signals indicating remaining time-to-go ($T-t$) until a preselected terminal instant of time (T); combining means responsive to sensed altitude and altitude rate for providing an altitude acceleration command signal ($\ddot{h}_c$) required to adjust both altitude rate and altitude to a desired value at said future time T, said combining means responsive to said sensing means and said time drive means for preselectively combining the outputs thereof in accordance with the relationship $$\ddot{h}_c = H_3(\dot{h} - \dot{h}_T) + H_1(\dot{h}_T - \dot{h}_c) + h K_1 + K_2(T-t)$$

where:

$\ddot{h}_c$ = altitude acceleration command required to adjust the final value of both altitude and altitude to rate
$\dot{h}_c$ = altitude rate command required to adjust the final value of both altitude and altitude rate $K_1$ = a first gain constant
$K_2$ = a second gain constant
$h$ = altitude
$\dot{h}$ = altitude rate
$\dot{h}_T$ = desired terminal altitude rate
$T$ = flare interval
$t$ = real time
$(T-t)$ = time-to-go
$H_3$ = system altitude rate weighting function
$H_1$ = system altitude rate error weighting function means for integrating $\ddot{h}_c$, and means responsive to the integrating means and to the altitude rate sensing means for deriving a control signal.

16. A two-condition terminal prediction landing system comprising means for sensing altitude ($h$) and altitude rate ($\dot{h}$); time-drive means providing signals indicating remaining time-to-go ($T-t$) until a preselected terminal instant of time (T); combining means responsive to sensed altitude and altitude rate for providing an altitude acceleration command signal ($\ddot{h}_c$) required to adjust both altitude rate and altitude to a desired value at said future time T, said combining means responsive to said sensing means and said time-drive means for preselectively combining the outputs thereof in accordance with the relationship $$\ddot{h}_c = -K_3\dot{h} + K_6\dot{h}_T + K_7\dot{h}_T(T-t) + K_1 h - \dot{h}_c(T-t) + H_5(K_T - \dot{h}) + H_4(\dot{h}_T - \dot{h}_c)$$

where:

$\ddot{h}_c$ = altitude acceleration command required to adjust the final value of both altitude and attitude rate
$K_1$ = a first gain constant
$K_3$ = a second gain constant
$K_6$ = a third gain constant
$K_7$ = a fourth gain constant
$h$ = altitude
$\dot{h}$ = altitude rate
$\dot{h}_T$ = desired terminal altitude rate
$T$ = flare interval
$t$ = real time
$(T-t)$ = time-to-go $H_5$ = system altitude rate weighting function
$H_4$ = system altitude rate error weighting function a lag network responsive to the output of the computer means, and means responsive to the lag network and to the altitude rate sensing means for deriving a control signal.

References Cited by the Examiner

UNITED STATES PATENTS

| | | | |
|---|---|---|---|
| 2,401,779 | 6/1946 | Swortzel | 235—193 X |
| 2,804,264 | 8/1960 | Stern | 235—184 |
| 2,955,762 | 10/1960 | Dietrich | 235—183 X |
| 2,965,300 | 12/1960 | Radley et al. | 235—193 |
| 3,026,038 | 3/1962 | Ederer | 235—187 |
| 3,081,969 | 3/1963 | Farris et al. | 235—150.22 |
| 3,157,783 | 11/1964 | Patchell et al. | 235—193 |

MALCOLM A. MORRISON, *Primary Examiner.*

A. J. SARLI, H. E. WURST, *Assistant Examiners.*